United States Patent [19]

Page et al.

[11] Patent Number: 5,694,500
[45] Date of Patent: Dec. 2, 1997

[54] OPTICAL AMPLIFIER OPERATING AT 1.3 MICRONS USEFUL FOR TELECOMMUNICATIONS AND BASED ON DYSPROSIUM-DOPED METAL CHLORIDE HOST MATERIALS

[75] Inventors: Ralph H. Page, San Ramon; Kathleen I. Schaffers, Pleasanton; Stephen A. Payne, Castro Valley; William F. Krupke, Pleasanton; Raymond J. Beach, Livermore, all of Calif.

[73] Assignee: The Regents of the University of California, Oakland, Calif.

[21] Appl. No.: 546,851

[22] Filed: Oct. 23, 1995

[51] Int. Cl.$^6$ ............................. G02B 6/28; H01S 3/14
[52] U.S. Cl. ..................... 385/24; 359/341; 359/342; 372/6; 372/39; 385/142
[58] Field of Search ........................ 385/15, 24, 27, 385/123, 142; 372/4–6, 39–42; 359/333, 341–343

[56] References Cited

U.S. PATENT DOCUMENTS

| | | | |
|---|---|---|---|
| 5,179,603 | 1/1993 | Hall et al. | 385/24 |
| 5,321,708 | 6/1994 | Tohmon et al. | 372/6 |
| 5,379,149 | 1/1995 | Snitzer et al. | 359/341 |
| 5,416,864 | 5/1995 | Cassidy et al. | 385/15 X |

OTHER PUBLICATIONS

Tanabe et al, "Optical Properties of Dysprosium–Doped Low–Phonon–Energy Glasses for a Potential 1.3 μm Optical Amplifier", *J. Am. Ceram. Soc.*, vol. 78, No. 11, Nov., 1995, pp. 2917–2922.

*Primary Examiner*—John D. Lee
*Attorney, Agent, or Firm*—Henry P. Sartorio

[57] ABSTRACT

Dysprosium-doped metal chloride materials offer laser properties advantageous for use as optical amplifiers in the 1.3 μm telecommunications fiber optic network. The upper laser level is characterized by a millisecond lifetime, the host material possesses a moderately low refractive index, and the gain peak occurs near 1.31 μm. Related halide materials, including bromides and iodides, are also useful. The $Dy^{3+}$-doped metal chlorides can be pumped with laser diodes and yield 1.3 μm signal gain levels significantly beyond those currently available.

20 Claims, 5 Drawing Sheets

OPTICAL AMPLIFIER OPERATING AT 1.3 MICRONS USEFUL FOR TELECOMMUNICATIONS AND BASED ON DYSPROSIUM-DOPED METAL CHLORIDE HOST MATERIALS

The U.S. Government has rights in this invention pursuant to Contract No. W-7405-ENG-48 between the U.S. Department of Energy and the University of California for the operation of Lawrence Livermore National Laboratory.

BACKGROUND OF THE INVENTION

1. Field of the Invention

The invention relates generally to optical amplifiers and more particularly to methods and apparatus used to recover or amplify the 1.3 μm optical signal propagated in an optical communications system, e.g., a telecommunications or cable television network.

2. Description of Related Art

The existing fiber optic-based communications infrastructure operates primarily near the 1.31 μm wavelength. Currently, electronic repeaters are employed to boost the information signal back up to its original level after it has traveled through several tens of kilometers of pathway. The attenuated signal arrives at the repeater where it is detected, electronically processed, and re-injected into the fiber optic system (usually with a laser diode transmitter). Since these electronic repeaters are expensive to build and operate, an all-optical version where the light is amplified in-line by stimulated optical gain would be far cheaper and simpler if it were available.

The telecommunications industry has recently experienced remarkable development, where laser diode-pumped $Er^{3+}$-doped silica ($SiO_2$) fibers were found to be capable of amplifying signals at the 1.55 μm signal wavelength (E. Desurvire, "The Golden Age of Optical Amplifiers," Physics Today, January 1994, pp. 20–27). Although the 1.55 μm peak gain wavelength does not correspond to the 1.31 μm wavelength of the existing communications infrastructure, it does provide an ideal opportunity since 1.55 μm is the wavelength of minimum loss available from $SiO_2$ fibers. This match between the Er:$SiO_2$ gain wavelength and the fiber loss minimum is so technically compelling that new long-haul telecommunication links (e.g., transoceanic) have incorporated this new approach. The technical issues associated with Er:$SiO_2$ amplifiers have been evaluated in detail and carefully addressed (R. G. Smart, et al., "Experimental Comparison of 980 nm and 1480 nm-pumped Saturated In-line Erbium-doped Fiber Amplifiers Suitable for Long-haul Soliton Transmission Systems," IEEE Photonics Technology Letters, 5, 770–773 (1993)). It is now highly desirable to identify an analogous amplifier that operates near 1.31 μm.

While there are many issues impacting the overall viability of an optical amplifier suitable for telecommunications, one important aspect is the need to maximize the so-called $\sigma_{em}\tau_{em}$ product, where $\sigma_{em}$ is the gain cross section and $\tau_{em}$ is the emission lifetime. The emission cross section can be evaluated with the aid of the simple expression:

$$\sigma_{em} = \frac{\lambda_p^4}{8\pi c n^2 \tau_{rad}\Delta\lambda_{em}}$$

where $\lambda_p$ is the peak emission wavelength, $\tau_{rad}$ is the radiative lifetime, c is the speed of light, $\Delta\lambda_{em}$ is the emission bandwidth, and n is the refractive index. The $\sigma_{em}\tau_{em}$ product can be most readily maximized on the basis of two particular parameters: maximizing the emission lifetime ($\tau_{em}$) and minimizing the refractive index (n).

The first reported attempt to devise a 1.3 μm amplifier for telecommunications entailed the use of well-known Nd-doped fibers. Nd-lasers are most familiar as generators of 1.04–1.08 μm light, although they are also capable of providing gain near 1.3 μm (albeit with reduced performance). When this option was explored in detail by researchers, it became apparent that Nd-doped materials were unlikely to offer adequate performance specifications. In brief, there are excited state absorption losses which reduce the available gain. The excited state absorption problem can be circumvented to some extent by using Nd-doped crystals (rather than glasses), since crystals often have sharp narrow gain peaks that fortuitously avert the excited state absorption peaks (Davis, et al., "1.3 μm Nd:YAG Crystal Fiber Amplifiers," IEEE Photonics Technology Letters, 3, 459–461 (1991)). Unfortunately, these materials can not allow the full advantage of propagating multi-wavelength information and also have serious noise problems related to the presence of amplified spontaneous emission from the 1.04–1.08 μm region.

The telecommunications industry subsequently shifted its attention to $Pr^{3+}$-based materials for the optical amplifier, and to the fluoride glass host known as ZBLAN (U.S. Pat. No. 5,309,452). Laser diode-pumped Pr:ZBLAN has much promise and a highly optimized amplifier structure that can offer adequate gain (Shimizu, et al., "28.3 dB Gain 1.3 μm-based Pr-doped Fluoride Fiber Amplifier Module Pumped by 1.017 μm InGaAs-LD's," IEEE Photonics Technology Letters, 5, 654–657 (1993); and Pedersen, et al., "Optimization of $Pr^{3+}$:ZBLAN Fiber Amplifiers," IEEE Photonics Technology Letters, 4, 446–448 (1992)). However, these optical amplifiers have not yet gained wide acceptance because four laser diode pump sources are required (running at relatively high power) to yield a suitable level of gain. High power operation greatly reduces laser diode reliability and increases power consumption. The fundamental basis of the very high laser diode pump power requirement is the short emission lifetime of the $Pr^{3+}$ excited state in the ZBLAN host, which is $\tau_{em}$=110 μsec. Since the radiative lifetime is about $\tau_{rad}$=3200 μsec, the emission yield ($\eta_{QY}$) can be estimated to be ($\tau_{em}/\tau_{rad}$)=(110/3200)=3%. In contrast, the highly successful Er:$SiO_2$ amplifier has an emission yield of 100%. While there are many issues entailed in comparing the Er:$SiO_2$ and Pr:ZBLAN amplifier modules, the short emission lifetime of Pr:ZBLAN requires that the gain element be pumped more than an order-of-magnitude harder than Er:$SiO_2$ ($\sigma_{em} \cdot \tau_{rad}$=0.05×10$^{-20}$ cm$^{-2}$•msec for Pr:ZBLAN versus 7×10$^{-20}$ for Er:$SiO_2$).

One way that optical engineers have been trying to recover from the inherent problems of the Pr:ZBLAN amplifier is by improving the waveguide design. For example, U.S. Pat. No. 5,185,847 teaches the use of channel waveguides instead of optical fibers, although substantial performance enhancement has yet to be realized in this manner. Other researchers have been exploring the use of sulfide-based host glasses (in lieu of the fluoride-based ZBLAN), since the lower phonon frequency of these glasses should lead to longer emission lifetimes (Medeiros, et al., "The Application of Ga:La:S-based Glass for Optical Amplification at 1.3 μm," Journal of Non-Crystalline Solids, 184, 292–296 (1995)). An emission lifetime of 282 μsec has been achieved with this approach, a value much longer than the 110 μsec of Pr:ZBLAN, although the very high refractive index of the glass (>2.0) is a disadvantage. One important issue that remains includes the fabrication of a low-loss sulfide fiber. For example, U.S. Pat. No. 5,378,664 discloses a possible means of using sulfide materials with enhanced glass-forming tendency. In addition, it has yet to be demonstrated that excited-state absorption is not a crucial impediment in the Pr:Sulfide glass amplifier. Other potential hosts for $Pr^{3+}$ include chloride glasses and crystals. Taylor ("Cadmium Mixed Halide Glass for Optical Amplification at 1.3 µm," Journal of Non-Crystalline Solids, 184, 61–67 (1995)) reported an improved $Pr^{3+}$ emission lifetime of 323 µsec. Finally, in addition to the $Nd^{3+}$- and $Pr^{3+}$-amplifiers discussed above, U.S. Pat. No. 5,140,658 discloses the possible use of the $Cr^{4+}$ ion as a laser ion to provide gain at 1.3 µm.

Most recently, researchers have been investigating the potential for the $Dy^{3+}$ ion to serve as a means of producing gain at 1.3 µm. U.S. Pat. No. 5,321,708 suggests that the $Dy^{3+}$ dopant in fluorides or $SiO_2$ might yield gain at 1.3 µm. It has subsequently been found, however, that the emission lifetime is exceedingly short in these materials such that they are rendered useless. Again, the sulfide glasses were found to have much higher emission yields than the fluorides or oxides (i.e. ZBLAN or $SiO_2$). Wei, et al. ("Spectroscopy of $Dy^{3+}$ in Ge-Ga-S Glass and its Suitability for 1.3 µm Fiber Optical Amplifier Application," Optics Letters, 19, 904–906 (1994)) and Samson, et al. ("Dysprosium-doped Ga:La:S Glass for an Efficient Optical Fibre Amplifier Operating at 1.3 µm," Electronics Letters, 30, 1617–1619 (1994)) have shown that 1.3 µm emission lifetimes as large as 227 µsec are possible. Again, the Dy:Sulfide amplifier concept awaits a convincing demonstration of adequate gain at 1.3 µm, using a low-loss optical waveguide structure.

$Dy^{3+}$ has previously been explored as a dopant in other materials such as chlorides, although its applicability to an optical amplifier for the telecommunications industry has not yet been recognized. For example, $Dy^{3+}$-doped chlorides have been investigated as possible materials useful for the upconversion of infrared light to visible wavelengths (Gandrud, et al., "Rare-earth Infrared Lifetimes and Exciton Migration Rates in Trichloride Crystals," Journal of Chemical Physics, 49, 2170–2182 (1968); and J. Ohwaki and Y. Wang, "1.3 µm to Visible Upconversion in $Dy^{3+}$- and $Er^{3+}$-co-doped $BaCl_2$ Phosphor," Applied Physics Letters, 65, 129–131 (1994)).

SUMMARY OF THE INVENTION

Accordingly, it is an object of the invention to provide $Dy^{3+}$-doped metal chloride materials exhibiting a 1.3 µm emission lifetime greater than or near 1 millisecond, which can be laser-pumped to serve as 1.3 µm optical amplifiers in the fiber-optic telecommunications network. The invention is preferably pumped by laser diodes operating at 1.3 µm, 1.1 µm, 0.9 µm, or other wavelengths with strong $Dy^{3+}$ absorption. The long emission lifetime and low refractive index of the $Dy^{3+}$-doped chloride hosts offer the promise of enhanced amplifier performance, compared to existing 1.3 µm technology options.

It is a further object of the invention to produce substantial gain in $Dy:LaCl_3$ and $Dy:SrCl_2$ at 1.31 µm when pumped near 917 nm with a laser or other pump source.

The invention is a method and apparatus for amplifying an optical signal in an optical communications system operating at 1.3 µm using a laser gain medium of $Dy^{3+}$-doped metal chloride, bromide, or iodide materials and pumping means, e.g., laser diodes, to induce gain near 1.3 µm. The invention relates particularly to the use of trivalent dysprosium-doped ($Dy^{3+}$) metal chloride materials as the gain medium in such devices and, most particularly, to laser diode-pumped $Dy^{3+}$-doped $LaCl_3$ crystals which offer gain near 1.3 µm for the fiber optic-based telecommunications network.

DETAILED DESCRIPTION OF THE INVENTION

When $Dy^{3+}$ ion is incorporated in a crystal or glass as a dopant, its atomic properties are modified by the host material. While the free-ion energy levels tend to occur at similar energy positions irrespective of the host, each electronic state is crystal-field-split into several nearby levels and broadened compared to those of the atom. On the other hand, the transition strengths and emission lifetimes are primarily dictated by the nature of the host material, and are very sensitive to the particular crystal or glass selected.

Figure 1:
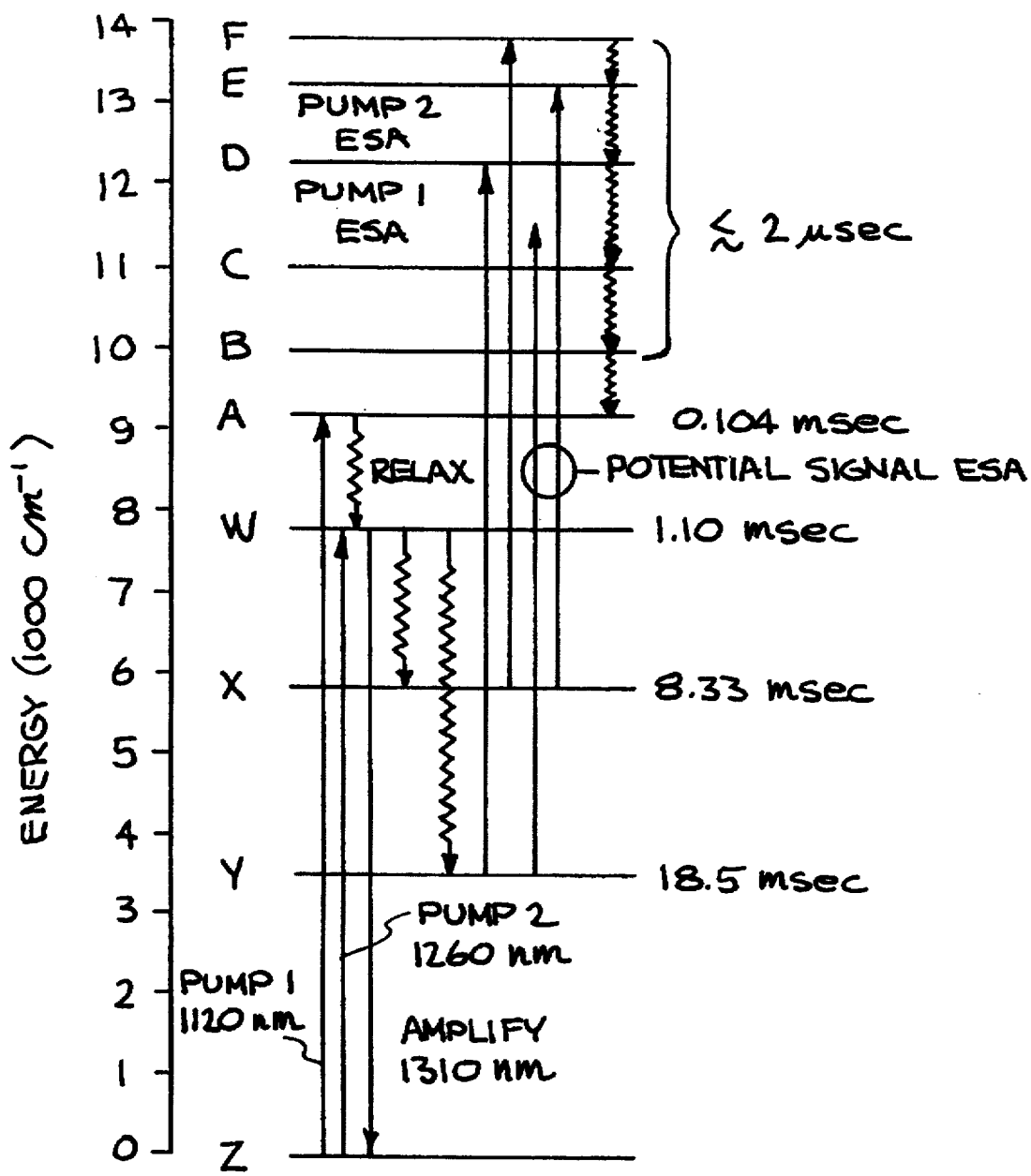
FIG. 1 illustrates the energy levels of the $Dy^{3+}$ ion, and indicates the important pump bands and the gain transition.

The energy levels of the $Dy^{3+}$ dopant in $SrCl_2$ are shown in FIG. 1, where the atomic designations, observed emission lifetimes, 1.3 µm laser transition, and several pump lines are noted. (The $Dy:SrCl_2$ crystal also contains several percent of $LaCl_3$ in order to reduce the clustering of the $Dy^{3+}$ ions.) It is possible to pump the $Dy^{3+}$ ions from the $^6H_{15/2}$ ground state to the numerous other levels on the basis of the absorption features.

In order for the $Dy^{3+}$ ion to operate usefully in a mode suitable for the 1.3 µm telecommunications application, the pump energy must tend to accumulate in the $^6F_{11/2+}^6H_{9/2}$ level, which can then offer gain at 1.3 µm by undergoing a transition back to the $^6H_{15/2}$ ground state. (Hereafter, the atomic state designations are referred to with the simple letter designations listed in FIG. 1—e.g. $^6F_{11/2+}^6H_{9/2}$ becomes the W state.) Two crucial aspects of the energy level diagram are that the W→Z transition offers gain at 1.31 µm; and that the Z→W, Z→A, Z→B and other transitions can serve as pump transitions to accumulate population in the W state.

The emission lifetimes indicated in FIG. 1 are also crucial, since they define the manner in which energy flows among the $Dy^{3+}$ levels. Importantly, the W upper laser level has a lifetime at 1.1 msec in $SrCl_2$, which permits the accumulation of population in this level and the generation of gain at 1.3 µm. In $LaCl_3$, the lifetime is also 1.1 msec. (The upper laser level lifetime is one of the crucial issues impacting the performance of the 1.3 µm optical amplifier for telecommunications.) The emission lifetime measurements also show that pumping the A, B, C, D or E levels will effectively deposit population into the W state, since the energy will rapidly relax to this level.

Further examination of the emission lifetimes in FIG. 1 shows that the X and Y levels, located intermediate to the Z/W lower/upper laser levels, can potentially have a detrimental impact on the laser performance via excited state absorption (ESA) losses. Any $Dy^{3+}$ population that resides in the X or Y state will be unavailable for participating in either the pumping or laser gain processes. In principle, this type of situation can be alleviated by designing an amplifier with greater $Dy^{3+}$ ion density in the pump pathlength to ensure adequate populations in the Z and W levels. In the event that parasitic absorptions originating from the X or Y levels decrease the gain in the 1.3 μm region, it would be necessary to directly force the populations out of these levels. The additional pumping from the X and Y levels would then restore the $Dy^{3+}$ ions to the W level, where they are again available to yield gain.

Figure 2:
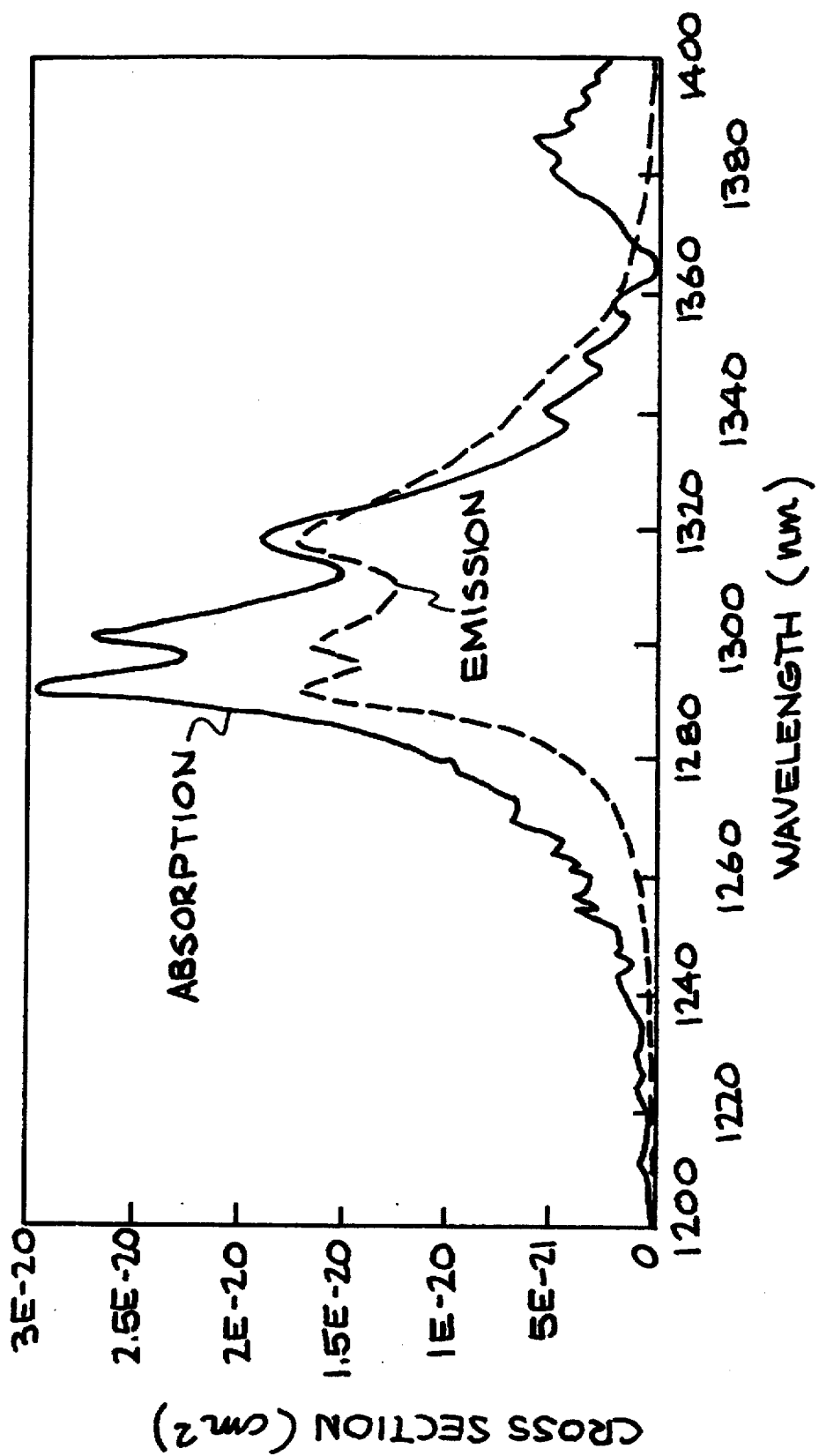
FIG. 2 is a plot of the absorption and emission transitions in the 1.3 µm region.

As an example of the spectra exhibited by $Dy^{3+}$-doped chlorides, the absorption and emission spectra of $Dy^{3+}$-doped $LaCl_3$ in the 1.3 μm region are graphed in FIG. 2. The $Dy:LaCl_3$ spectra are plotted on a quantitative cross section scale and can be interpreted to suggest the wavelengths where it should be possible to achieve a substantial level of gain. The gain will be highest where the emission cross section is high and the absorption is low. The actual shape of the gain spectrum is dependent on the fraction of $Dy^{3+}$ ions that are inverted. For the limiting case where 100% of the $Dy^{3+}$ ions are inverted, the gain spectrum would closely match the emission spectrum plotted in FIG. 2. The $\sigma_{em}\tau_{em}$ product is $1.6\times10^{-20}$ cm² msec for $Dy:LaCl_3$, compared to $0.05\times10^{-20}$ for Pr:ZBLAN. The long emission lifetime and small refractive index of n=1.65 both are beneficial.

Figure 3:
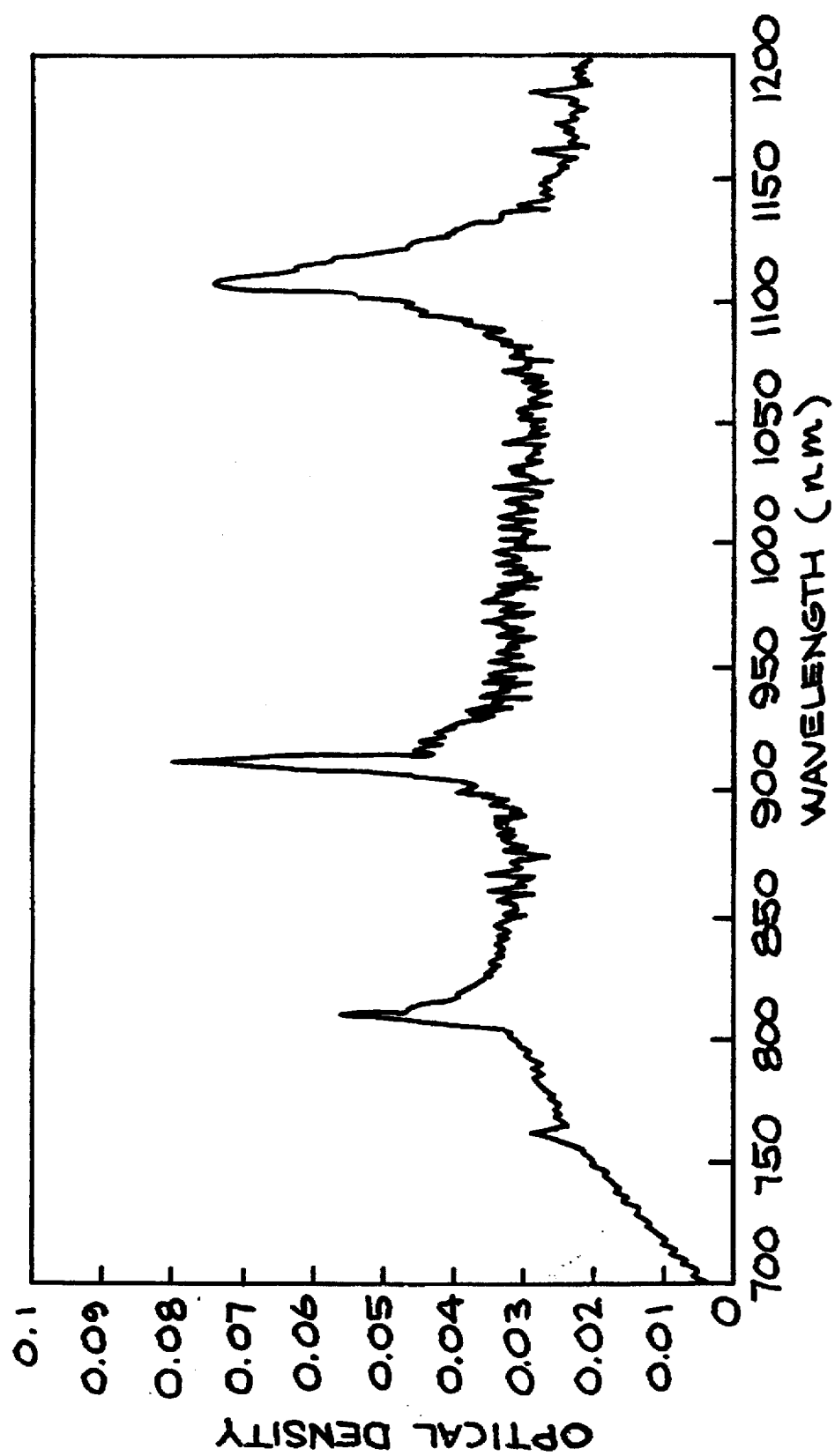
FIG. 3 displays several of the alternative pump bands at which the laser diode output can be set, including 1.1, 0.9, and 0.8 µm.

Several of the potential pump bands shown in FIG. 3 may be used in addition to the 1.3 μm absorption band shown in FIG. 2. Pump bands exist at 0.8, 0.9, 1.1 and 1.3 μm, and from FIG. 1 they are all expected to rapidly relax to the W upper laser level. More pump bands exist at shorter wavelengths. The bands depicted in FIG. 3 are noteworthy because reliable laser diode pump sources are known to exist at these wavelengths.

From the absorption, emission, and emission lifetime data of FIGS. 1, 2, and 3, $Dy^{3+}$-doped chlorides should be capable of yielding gain the important telecommunications wavelengths near 1.3 μm. The realization of gain has been explicitly demonstrated for the case of $Dy:LaCl_3$, where the data in FIG. 4 corresponds to the case of pumping at 0.917 μm with a 200 μsec pulse and probing the response of the material at 1.32 μm. The percentage increase in the probe beam power is seen to rise steeply at first, and then to plateau. The increase of the 1.32 μm probe arises from both the increase in transmission due to the bleaching of the ground state absorption (Z→W) and also to the emergence of gain from the W→Z transition.

Figure 4:
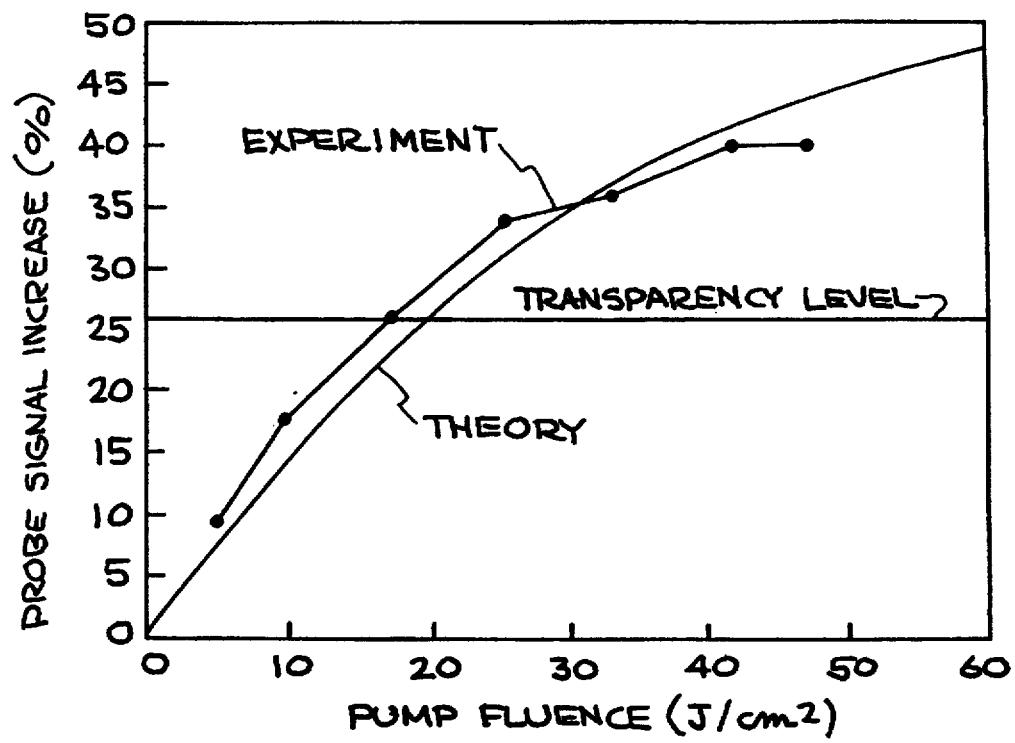
FIG. 4 provides the experimental demonstration of gain at 1.32 µm as a function of fluence.

FIG. 4 indicates the 1.32 μm probe level at which the absorption and gain are balanced, such that the $Dy:LaCl_3$ sample becomes transparent. Above the point of optical transparency, gain is realized. This result is important because it confirms that the interpretation of the spectroscopic and lifetime measurements is consistent with the observed gain, indicating that no unanticipated pump-induced losses are present. The gain plateau arises from the depletion of the $Dy^{3+}$ ground state population and the saturation of the W-level population.

Figure 5A:
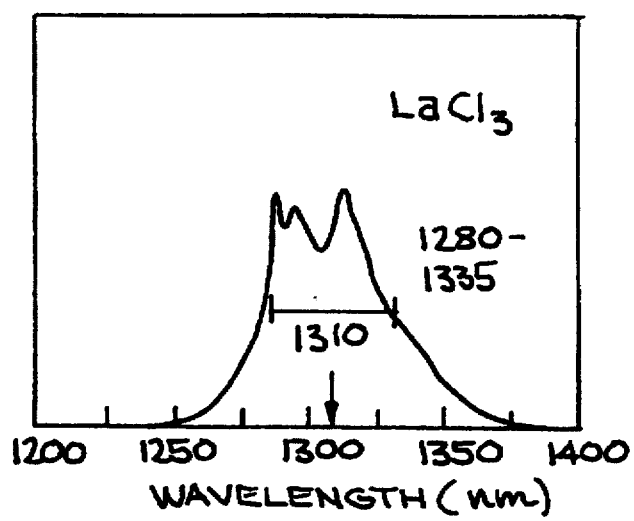
FIGS. 5A, B, C, show the emission spectra of $Dy^{3+}$ in other metal chloride crystal hosts that can provide gain at the 1.28–1.335 µm range (i.e., SONET standard).
Figure 5B:
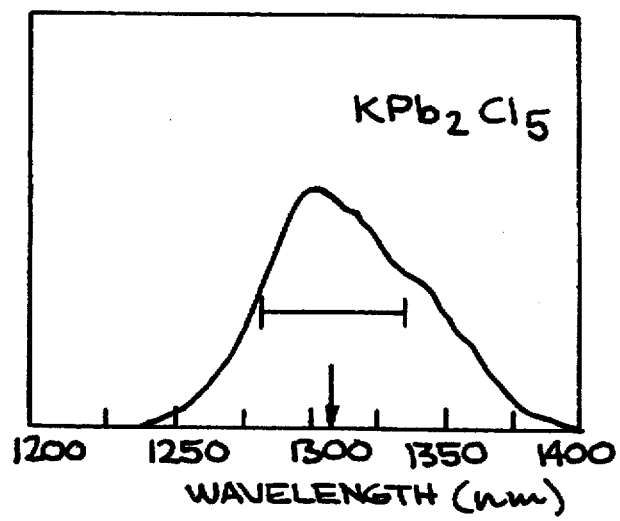
Figure 5C:
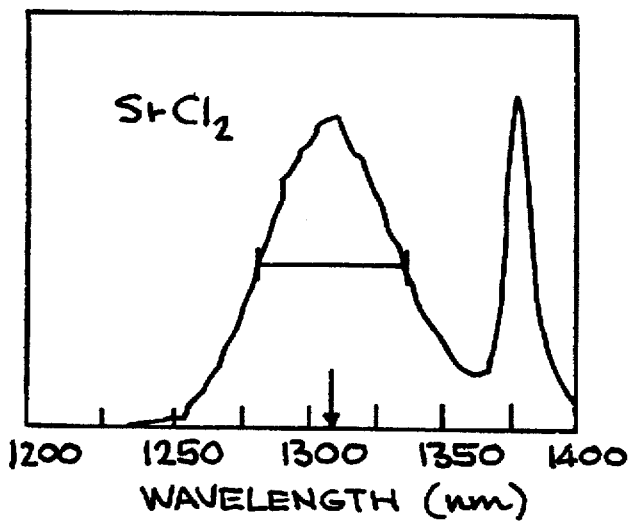

FIGS. 5A, B, C indicate that the results achieved for $Dy:LaCl_3$ will be generally similar for other $Dy^{3+}$-doped metal chloride host materials. For example, in comparing the emission spectra of $LaCl_3$, $SrCl_2$ and $KPb_2Cl_5$ crystals, it is deduced that all of these materials can offer gain in the telecommunications-relevant Synchronous Optical Network (SONET) range of 1.28–1.335 μm (where future wavelength-multiplexed systems are expected to operate). Many different $Dy^{3+}$-doped chloride materials offer spectroscopic features that are consistent with the requirements of the optical amplifiers needed for telecommunications. The emission lifetimes of the W upper laser level (i.e., the 1.3 μm lifetime) tends to be near one millisecond for most metal chloride hosts. Metal bromides and metal iodides will also have similar characteristics. The optimal metal halide host material for telecommunications will need to be amenable to fabrication into a device structure consistent with system requirements.

Preferred materials for the optical amplifier include $Dy^{3+}$-doped metal chloride host materials wherein the metal chloride host material has the chemical formula $MCl_3$, where M is a trivalent metal ion selected from $La^{3+}$, $Y^{3+}$, $Sc^{3+}$, $Ga^{3+}$, $Lu^{3+}$, and other rare earth ions, or $MCl_2$, where M is a divalent metal ion selected from $Mg^{2+}$, $Ca^{2+}$, $Sr^{2+}$, $Ba^{2+}$, and $Pb^{2+}$. Similar bromides and iodides may be used. The metal chloride, bromide or iodide host material may include small amounts of other anions selected from $S^{2-}$, $Se^{2-}$, $Te^{2-}$, $F^-$, $Br^-$ and $I^-$. The host material may be in the form of an amorphous or glassy material. The host material preferably has a refractive index less than 2.0 at 1.3 μm, and more preferably it closely index matches the refractive index of the optical fibers, which is about 1.46 for silica fibers.

The pumping means are preferably a diode laser which operates near 1.3 μm, 1.1 μm, 0.9 μm, or 0.8 μm. The pumping means induces gain near 1.31 μm, e.g., within the range of 1.25 to 1.40 μm.

Figure 6A:
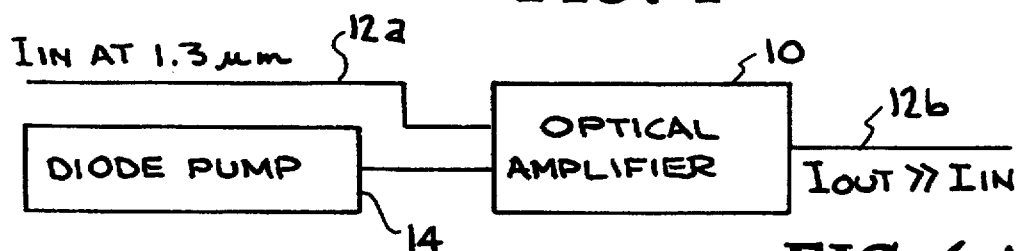
FIG. 6A is a schematic diagram of an optical amplifier based on Dy-doped chloride materials as a repeater or other amplifier within a 1.3 µm telecommunications network.

FIG. 6A broadly depicts the uses of an optical amplifier 10 for telecommunications. The amplifier 10 can be employed as a repeater, where the 1.3 μm signal beam is returned to its original signal level following the attenuation experienced after traversing several tens of kilometers within the fiber optic network 12a,b. Alternatively, it may be used to boost the signal so that it is detected more easily, or after encountering a lossy point (e.g., a distribution node) within the network. Amplifier 10 is pumped by laser diode 14. In the optical communications system, a plurality of optical fiber segments 12a,b are connected in sequence for transmitting an optical signal therethrough, each segment having a length sufficient to substantially attenuate the optical signal. The optical amplifier 10 couples a first optical fiber segment 12a to a second optical fiber segment 12b. The attenuated signal from fiber 12a is amplified by amplifier 10 and input into fiber 12b.

Figure 6B:
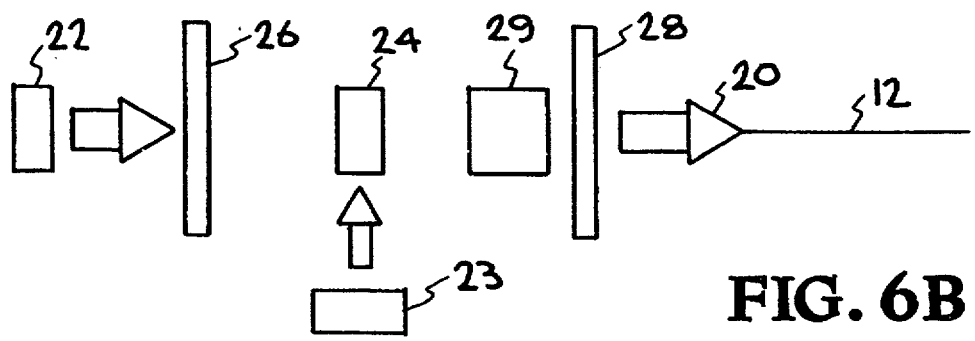
FIG. 6B is a schematic diagram of a laser oscillator based on Dy-doped chloride materials.

The $Dy^{3+}$-doped metal chloride gain medium can also be deployed as a 1.3 μm transmitter, oscillator, or pre-amplifier, as illustrated in FIG. 6B. The pump source 22 can be a laser diode, a laser diode array, or another laser arranged to longitudinally pump the gain medium 24 through the resonator mirror 26. The output coupling mirror 28 is aligned to form the laser resonator. The output beam 20 is generated by pumping the gain medium 24 with the pump source 22. Alternatively, a pump source 23 which is transverse to the optical axis of the cavity can be used. The pump source could also be an incoherent source, e.g., flashlamps or LEDs, as well as a laser. The output beam 20 is input into the optical fiber network 12. A modulator or other optical component 29 may be included in the cavity to manipulate the properties of the laser beam generated, e.g., to properly format the beam for the particular application. Modulator or other optical component 29 could alternately be placed outside the cavity.

Changes and modifications in the specifically described embodiments can be carried out without departing from the scope of the invention which is intended to be limited only by the scope of the appended claims.

The invention claimed is:

1. An optical amplifier for an optical communications system comprising:
    a laser gain medium comprising a $Dy^{3+}$-doped metal chloride, bromide or iodide host material;
    pumping means to induce laser gain near 1.31 μm in said medium;
    wherein said $Dy^{3+}$ dopant exhibits an emission lifetime greater than or about one millisecond at the 1.31 μm emission wavelength.

2. The optical amplifier of claim 1 wherein said host material is a metal chloride.

3. The optical amplifier of claim 2 wherein the metal chloride host material has the chemical formula $MCl_3$, where M is a trivalent metal ion selected from the group consisting of $La^{3+}$, $Y^{3+}$, $Sc^{3+}$, $Ga^{3+}$, $Lu^{3+}$, and other rare earth ions.

4. The optical amplifier of claim 2 wherein the metal chloride host material has the chemical formula $MCl_2$, where M is a divalent metal ion selected from the group consisting of $Mg^{2+}$, $Ca^{2+}$, $Sr^{2+}$, $Ba^{2+}$, and $Pb^{2+}$.

5. The optical amplifier of claim 1 wherein said pumping means induces gain within the range of 1.25 to 1.40 μm.

6. The optical amplifier of claim 1 wherein said pumping means comprises a diode laser.

7. The optical amplifier of claim 6 wherein the diode laser pumping means operates near 1.3 μm.

8. The optical amplifier of claim 6 wherein the diode laser pumping means operates near 1.1 μm, 0.9 μm, or 0.8 μm.

9. The optical amplifier of claim 1 wherein the metal chloride, bromide or iodide host material includes small amounts of other anions selected from the group consisting of $S^{2-}$, $Se^{2-}$, $Te^{2-}$, $F^-$, $Br^-$ and $I^-$.

10. The optical amplifier of claim 1 wherein the host material is in the form of an amorphous or glassy material.

11. The optical amplifier of claim 1 further comprising cavity forming means aligned with the gain medium to form a laser resonator and to generate a laser beam near 1.31 μm.

12. The optical amplifier of claim 1 further comprising additional pumping means to pump the excited state population from the X or Y intermediate energy levels of the $Dy^{3+}$ laser ions.

13. The optical amplifier of claim 1 wherein said gain medium is $Dy^{3+}$-doped $LaCl_3$.

14. The optical amplifier of claim 1 wherein said gain medium is $Dy^{3+}$-doped $SrCl_2$.

15. The optical amplifier of claim 14 further comprising an $LaCl_3$ dopant in said $SrCl_2$ host material.

16. The optical amplifier of claim 1 wherein said host material has a refractive index less than 2.0 at 1.3 μm.

17. A method of amplifying an optical signal in an optical communication system, comprising:
    providing a laser gain medium comprising a $Dy^{3+}$-doped metal chloride, bromide or iodide host material;
    pumping said laser gain medium to induce laser gain near 1.31 μm in said medium, wherein said $Dy^{3+}$ dopant exhibits an emission lifetime greater than or about one millisecond at the 1.31 μm emission wavelength;
    inputting the optical signal into said pumped laser gain medium to produce an amplified optical signal.

18. The method of claim 17 wherein the host material is a metal chloride having the chemical formula $MCl_3$, where M is a trivalent metal ion selected from the group consisting of $La^{3+}$, $Y^{3+}$, $Sc^{3+}$, $Ga^{3+}$, $Lu^{3+}$, and other rare earth ions, or $MCl_2$, where M is a divalent metal ion selected from the group consisting of $Mg^{2+}$, $Ca^{2+}$, $Sr^{2+}$, $Ba^{2+}$, and $Pb^{2+}$.

19. The method of claim 17 further comprising pumping said laser gain medium with a diode laser.

20. An optical communications system comprising:
    a plurality of optical fiber segments connected in sequence for transmitting an optical signal therethrough, each segment having a length sufficient to substantially attenuate the optical signal;
    an optical amplifier coupling a first of said optical fiber segments to a second of said optical fiber segments, said optical amplifier comprising:
        a laser gain medium comprising a $Dy^{3+}$-doped metal chloride, bromide or iodide host material;
        pumping means to induce laser gain near 1.31 μm in said medium;
        wherein said $Dy^{3+}$ dopant exhibits an emission lifetime greater than or about one millisecond at the 1.31 μm emission wavelength.

* * * * *